(No Model.)

A. WARENSKJOLD & J. G. BURGESS.
VEHICLE RUNNING GEAR.

No. 457,388. Patented Aug. 11, 1891.

WITNESSES:
A. J. Schwartz
J. F. Reily

Axel Warenskjold
John G. Burgess
INVENTORS.

BY
W. Fitzgerald
ATTORNEY.

UNITED STATES PATENT OFFICE.

AXEL WARENSKJOLD AND JOHN G. BURGESS, OF SAN DIEGO, CALIFORNIA.

VEHICLE RUNNING-GEAR.

SPECIFICATION forming part of Letters Patent No. 457,388, dated August 11, 1891.

Application filed November 14, 1890. Serial No. 371,479. (No model.)

*To all whom it may concern:*

Be it known that we, AXEL WARENSKJOLD and JOHN G. BURGESS, citizens of the United States, residing at San Diego, in the county of San Diego and State of California, have invented certain new and useful Improvements in Duplex Gear for Vehicles; and we do hereby declare the following to be a full, clear, and exact description of the invention, such as will enable others skilled in the art to which it appertains to make and use the same.

Our invention consists in certain new and useful improvements in vehicles, especially in the running-gear thereof, in which the front and rear axles are connected by inclined reaches which cross each other at their centers, so that the vehicle can be turned in a much shorter curve than is possible where a straight central pole or reach is employed; in constructing the vehicle with both front and rear wheels of the same size for a purpose hereinafter specified; in providing it with two fifth-wheels, which are mounted at the center of the two axles, arranged so that the kingbolt of each fifth-wheel is to one side of the axle, and in certain other new and novel features, and our invention will be hereinafter fully described and claimed.

Figure 1:
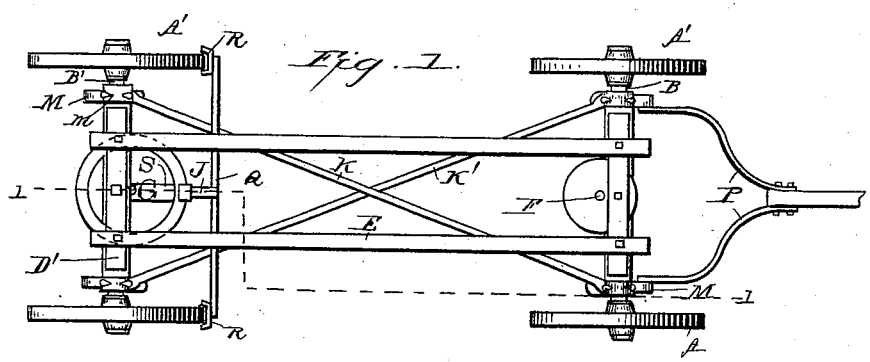
Figure 2:
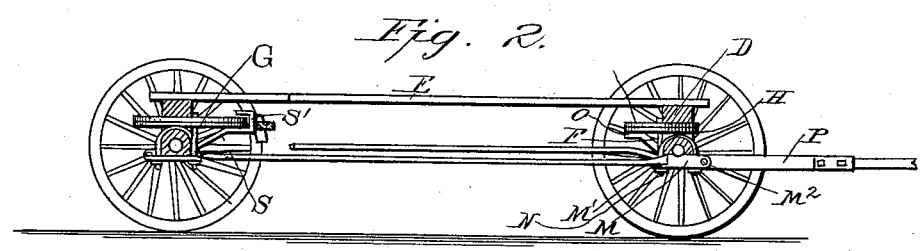
Figure 3:
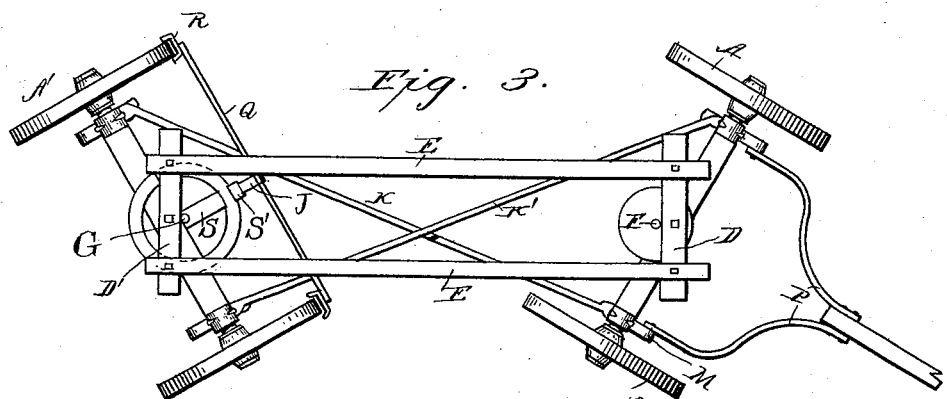

Referring to the accompanying drawings, Figure 1 is a top plan view of the running-gear of a vehicle embodying our invention. Fig. 2 is a vertical sectional view taken on lines 1 1 of Fig. 1. Fig. 3 is a top plan view showing the running-gear turned as in rounding a curve.

The same letters of reference indicate corresponding parts in all the figures.

Referring to the several parts by letter, A and A' indicate, respectively, the front and rear wheels of the vehicle, which are all of the same size. These wheels are mounted and revolve on the ends of the front and rear axles B B'. Upon both of the axles, near their ends, are secured clips $m$, the lower ends of which pass through apertures in bearing-blocks M and have the usual nuts screwed upon their lower extremities. These blocks M are recessed on the upper side of their inner ends at M', forming seats, upon which the ends of the inclined reaches are secured, as hereinafter described, while the outer ends of these blocks are formed with the eyes $M^2$. The ends of the tongue-reaches P are normally bolted to the eyed ends of the box M on the front axles, but where the vehicle meets with an obstruction in the road or becomes stuck in the mud in rainy weather the tongue can be at once detached by removing the bolts $p$, and as readily attached to the eyed outer ends of the box M on the rear axle, thereby enabling the vehicle to be drawn backward out of the mud or to be driven back in the opposite direction. The advantage of forming the front and rear wheels of the same size will be now apparent, as the vehicle can be driven either forward or backward with equal readiness.

K and K' indicate two inclined reaches, the apertured ends of which are pivotally secured by the bolts N on the shouldered inner end of the box M, as shown in the drawings. The two reaches thus cross each other at their centers, and it will be seen, more particularly by reference to Fig. 3 of the drawings, that on turning the team to either side in turning around a curve the inclined reaches will serve to draw both the wheels on the inner side of the curve toward each other, both axles turning simultaneously, as shown, and thereby enabling a much shorter turn to be made than is possible where a straight central reach is used connecting the two axles. This feature of our invention will be readily understood.

Upon the center of the front axle is secured a clip C, to the rear straight side of which the front king-bolt F is secured, or the two may be made integral. The lower plate of the front fifth-wheel H is secured centrally upon the upper end of this king-bolt, its inner end being supported by an inclined brace O, which runs up from the king-bolt, as shown, forming a support at its upper end. The upper plate of the front fifth-wheel is pivotally mounted upon the king-bolt F, and the front bolster D is secured thereon, as shown. On the rear axle is mounted in a similar manner the rear king-bolt G and the rear fifth-wheel I, except that the inclined brace S of the rear king-bolt has its end extended beyond the fifth-wheel to form an arm S', to the end of which a brake-bar Q is pivoted by its arm J, this brake having the brake-shoes R, which can act upon the rear running-wheels of the vehicle. Upon the outer part of the rear fifth-wheel is secured the bolster D', and the bolsters D and D' are connected by the straight reaches E.

It will be seen that by our new and novel king-bolt we dispense with the necessity of a center opening through an axle for the king-bolt, as is now required, thereby leaving the axle of its full strength at the point where the greatest strain comes upon it. The king-bolts, as shown, are mounted at the center of the axles by the inner side thereof, so that the weight and strain in turning on these pivoted bolts comes directly on the bolt and on its inclined brace.

The reaches can be readily constructed in adjustable sections, so as to increase or lengthen the distance between the two axles, according to the nature of the load to be carried.

A suitable operating-lever is provided for the brake, which it is not necessary to further describe or illustrate.

The front fifth-wheel is preferably only one-half the size of the rear fifth-wheel, as shown.

From the foregoing description, taken in connection with the accompanying drawings, the construction, operation, and advantages of our invention will be clearly seen. It will be seen that by pivotally connecting the ends of the inclined reaches K K' that they can be readily disconnected and placed one on each side in a straight line from one axle to the other, as desired, or the forward ends of the reaches can be disconnected and mounted on the lower end of the forward king-bolt, or the two axles can be readily detached and used separately, if so desired.

Having thus described our invention, what we claim, and desire to secure by Letters Patent, is—

The combination of the king-bolt secured at the inner side of the axle and having the inclined brace S, formed with the extended end S', and the brake-beam having a central arm pivoted to said end and provided at its end with the brake-shoes, as set forth.

In testimony whereof we have affixed our signatures in presence of two witnesses.

AXEL WARENSKJOLD.
JOHN G. BURGESS.

Witnesses:
W. B. SMITH,
W. T. FITZGERALD.